United States Patent [19]

Kobayashi et al.

[11] Patent Number: 5,262,558
[45] Date of Patent: Nov. 16, 1993

[54] METHOD OF MAKING ORGANO-SILICON POLYMERS HAVING MONO- AND TETRA-FUNCTIONAL SILOXANE UNITS

[75] Inventors: Hideki Kobayashi; Wataru Nishiumi, both of Chiba, Japan

[73] Assignee: Dow Corning Toray Silicone Co., Ltd., Tokyo, Japan

[21] Appl. No.: 932,845

[22] Filed: Aug. 20, 1992

[30] Foreign Application Priority Data

Aug. 22, 1991 [JP] Japan .................. 3-235533

[51] Int. Cl.⁵ .................................. C07F 7/08
[52] U.S. Cl. .......................... 556/453; 556/455; 556/459; 528/12
[58] Field of Search .............. 556/453, 455, 454; 528/12

[56] References Cited

U.S. PATENT DOCUMENTS

| | | | |
|---|---|---|---|
| 4,260,715 | 4/1981 | de Montigny et al. | 556/453 |
| 4,611,042 | 9/1986 | Rivers-Farrell et al. | 556/453 X |
| 4,707,531 | 11/1987 | Shirahata et al. | 556/453 X |
| 4,855,381 | 8/1989 | Mutoh et al. | 556/453 X |
| 5,011,962 | 4/1991 | Staiger et al. | 556/453 |

FOREIGN PATENT DOCUMENTS 195129 8/1986 Japan .

*Primary Examiner*—Paul F. Shaver
*Attorney, Agent, or Firm*—Arne R. Jarnholm

[57] ABSTRACT

There is disclosed a method for making organo-silicon polymers from alkyldisiloxanes and alkylsilicates wherein the alkyl groups of the disiloxanes have two or more carbons. Gelling of the organo-silicon polymers is avoided by; first mixing the disiloxane with the alkylsilicate and adding thereto a strong protic acid; and, after reaction has occurred in the aforementioned mixture, adding thereto, in a drop-wise manner, a solution of hydrochloric acid.

8 Claims, No Drawings

METHOD OF MAKING ORGANO-SILICON POLYMERS HAVING MONO- AND TETRA-FUNCTIONAL SILOXANE UNITS

BACKGROUND OF THE INVENTION

1. Field of the Invention

The present invention relates generally to a method of making organo-silicon polymers and more specifically to a method of making such polymers having both mono- and tetra-functional siloxane units.

2. Description of the Prior Art

Organo-silicon polymers having both mono- and tetra-functional siloxane units are well known in the art. In the past, such polymers have generally been prepared by cohydrolysis of a hydrolyzable silane or disiloxane (which are used as the feed material for mono-functional siloxane units) and a silicate salt or an alkyl silicate (which are used as the feed material of the tetra-functional siloxane units.)

When a disiloxane is used as the feed material for the mono-functional siloxane units, the average molecular weight can be controlled, so that the organo-silicon polymer which forms can have a relatively narrow distribution of the average molecular weight.

In Japanese Kokai Patent Application No. Sho 61[1986]-195129 there is proposed such a method wherein tetraethoxysilane or another alkyl silicate is added drop-wise to a mixture of hexamethyldisiloxane or other alkyldisiloxane, concentrated hydrochloric acid, water and ethanol. The drawback of the method, however, is that when a disiloxane having $C_2$ or higher monovalent hydrocarbon radicals is used as the feed material, the products formed therein have a tendency to gel during reaction. The gel so-formed is resistant to dissolution, even with the addition of more solvent.

In accordance with the method of the present invention, the tendency of the reaction products to gel during formation has been overcome, even when a mixture of disiloxane having $C_2$ or higher monovalent hydrocarbon radical and alkyl silicate is used as the feed material in making the aforementioned organo-silicon polymer.

SUMMARY OF THE INVENTION

In accordance with the present invention there is provided a method for making an organo-silicon polymer of the general formula:

$$(Me_2RSiO_{\frac{1}{2}})_m(SiO_{4/2})_n$$

wherein:
Me is a methyl radical;
R is a substituted or unsubstituted monovalent hydrocarbon radical having two or more carbon atoms; and
the ratio of m/n is between 0.2 and 4;
the method comprising the steps of:
mixing components
(A) a disiloxane of the general formula $(Me_2RSiO)_2$ (wherein Me and R are as defined above) and
(B) an alkyl silicate;
said components (A) and (B) being present in a molar ratio of substantially ½ m/n; 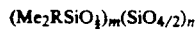
adding between 0.005 parts and 50 parts by weight of a strong protic acid to 100 parts by weight of the above mixture of components (A) and (B) and allowing the same to react; and
adding an aqueous solution of hydrochloric acid to the above reaction mixture in a drop-wise manner.

As used herein in connection with the description of component (B), the term "alkyl silicate" is meant to include partial hydrolysis products of alkyl silicates.

Also as used herein to describe the addition of certain reactants or catalysts, the term "drop-wise" means that the reactant or catalyst is being added at a relatively slow rate. In the case of an experiment being carried out on a laboratory scale, such additions are made at a rate that is literally drop-wise. Those skilled in the art, however, will recognize that for the same reaction being carried out on a manufacturing or pilot plant scale, the use of the term "drop-wise" will not mean that the addition is literally being made drop-wise, but that the rate of addition is relatively slow.

DETAILED DESCRIPTION OF THE INVENTION

In accordance with the method of the invention, a mixture of a disiloxane and an alkyl silicate is first made. A strong protic acid is then added to the mixture and reaction is allowed to proceed. Thereafter, an aqueous solution of hydrochloric acid is added to the reaction mixture in a drop-wise manner, which results in the production of the organo-silicon polymer.

The disiloxanes used in the method of the invention are represented by the general formula $(Me_2RSiO)_2$, wherein R represents a substituted or unsubstituted monovalent hydrocarbon radical, such as: an ethyl radical, propyl radical, butyl radical, or other alkyl radical; a cyclohexyl radical, or other cycloalkyl radical; a vinyl radical, allyl radical, hexenyl radical, or other alkenyl radical; a phenyl radical, xylyl radical, or other aryl radical; a phenylethyl radical, or other aralkyl radical; or 3-chloropropyl radical, 3,3,3-trifluoropropyl radical, etc. The various types of disiloxanes may be used either alone or in combination.

Examples of alkyl silicates (which by definition include partial hydrolysis products thereof) used in the method of the invention include orthomethyl silicate, polymethyl silicate, orthoethyl silicate, polyethyl silicate, orthopropyl silicate and polypropyl silicate.

Strong protic acid catalysts suitable for practicing the method of the invention include sulfuric acid, trifluoromethanesulfonic acid, chlorosulfonic acid, trichloroacetic acid, trifluoroacetic acid, p-toluenesulfonic acid, phosphoric acid, nitric acid, etc.

In the first stage of the method of the invention, a strong protic acid is added to a mixture of the disiloxane, component (A), and the alkyl silicate, component (B), for reaction therewith. The mixing ratio of component (A) to the component (B) should be selected such that the ratio of the mono-functional siloxane units to the tetra-functional siloxane units of the organo-silicon polymer (i.e. m/n) represented by the general formula $(Me_2RSiO_{\frac{1}{2}})_m(SiO_{4/2})_n$ is between 0.2-4.

The amount of the strong protic acid catalyst added to 100 parts by weight of the sum of components (A) and (B) should be 0.005-50 parts by weight, or preferably 0.015-10 parts by weight.

The first stage of the method of the invention is preferably carried out at a temperature between about 0° C. and 180° C., and more preferably between room temperature and 100° C. The reaction time may depend on the reaction temperature, and is usually 30 minutes to 3 days.

More specifically, the reaction time for the first stage is determined by tracing the decrease in the amount of disiloxane, component (A), using chromatography or other analysis means. In the first stage, a portion of component (A) is decomposed to silane represented by the formula SiOR'(CH$_3$)$_2$R (wherein R has the same meaning as above and R' represents the alkyl radical in component (B)), and the other portion is taken up into alkyl silicate in units of (CH$_3$)$_2$RSiO.

In carrying out the first stage of the method of the invention, an organic solvent not directly related to the reaction may be added as a diluent to the mixture of components (A) and (B). Examples of such organic solvents include benzene, toluene, xylene and other aromatic hydrocarbons; hexane, heptane, and other alkanes; diethyl ether, tetrahydrofuran, and other ethers; acetone, methyl isobutyl ketone, and other ketones; 1,1,2-trichlorotrifluoroethane, 1,1,1,-trichloroethane, dichloromethane, α,α,α-trifluorotoluene, hexafluoroxylene, and other halogenated hydrocarbons; methanol, ethanol, isopropanol and other alcohols; etc.

In accordance with the method of the invention, a second reaction results when hydrochloric acid solution is added drop-wise to the aforementioned reaction mixture. It is preferred that an aqueous hydrochloric acid solution containing over 5 wt % of hydrogen chloride, or more preferably over 10 wt % hydrogen chloride, be used. The amount of the aqueous hydrochloric acid solution should be enough to ensure that the amount of water contained in the hydrochloric acid solution is enough to perform hydrolysis for all of the alkoxy radicals present after the strong protic acid has been added to the mixture of components (A) and (B). However, it is also acceptable to use more aqueous hydrochloric acid solution. The temperature during the drop-wise addition should be 0°–100° C. It is nevertheless convenient to use the temperature set for the first stage of operation continuously.

After the end of the first stage of the method of the invention and before drop-wise addition of aqueous hydrochloric acid solution in the second stage of the invention, it is acceptable to add hydrolyzable alkyl silane represented by the formula R"$_3$SiX (where R" represents a monovalent hydrocarbon radical, X represents halogen atom or alkoxy radical, etc.) as the feed material of mono-functional siloxane units.

As described above, it is possible to manufacture organo-silicon polymers represented by the general formula (Me$_2$RSiO$_\frac{1}{2}$)$_m$(SiO$_{4/2}$)$_n$ where Me, R, m and n have the same meanings as above.

After the method of the invention is used to make the aforementioned organo-silicon polymer, the organic layer is isolated from the water layer; the organic layer is neutralized and washed with water; dehydration is carried out in an azeotropic process with the organic solvent. If needed, the organic solvent is removed, and the desired organo-silicon polymer is isolated.

The following examples illustrate the method of the invention in greater detail. In the examples, Me represents a methyl radical, and Et represents an ethyl radical.

APPLICATION EXAMPLE 1

11.9 g (0.04 mol) of component (A) represented by the formula (CH$_2$=CHC$_4$H$_8$Me$_2$Si)$_2$O, 41.6 g (0.2 mol) of tetraethoxysilane, 20 g of toluene, and 0.03 g of trifluoromethanesulfonic acid were added to a flask, and reaction was performed at 65° C. for 5 hours while the mixture was stirred.

As the reaction mixture was analyzed using gas chromatography, it was found that almost all of component (A) disappeared. Then at 60° C., a mixture of 10.1 g of water and 6.8 g of 36% aqueous hydrochloric acid solution was added drop-wise over 30 minutes. After the end of the drop-wise addition, stirring was continued at 72° C. for 6 hours. Then the reaction mixture was cooled and 50 g of toluene were added. The organic layer was isolated from the water layer, and was washed with water to neutrality. It was then moved to a flask with a water isolating tube attached, where dehydration was performed at reflux temperature. After cooling, the solvent was removed, and 14.3 g of light-yellowish transparent oil-like substance were obtained.

The analytical results of the oil-like substance are as follows.

$^{29}$SiNMR δ(ppm): 13(0.33Si, br, CH$_2$=CHC$_4$H$_8$Me$_2$SiO$_\frac{1}{2}$); Si-100(0.19Si, br, ROSiO$_{3/2}$); -110(0.48Si, br, SiO$_{4/2}$); (R is CH$_3$CH$_3$CH$_2$ or H.).

$^{13}$CNMR δ(ppm): 139(1.00C, s, =CH—); 115(0.94C, s, CH$_2$=); 59(1.54C, s, —OCH$_2$CH$_3$); 34(1.00C, s, Si(CH$_2$)$_3$CH$_2$—); 33(1.06C, s, Si(CH$_2$)$_2$CH$_2$—); 23(0.90C, s, SiCH$_2$CH$_2$—); 18(2.56C, s, SiCH$_2$— or —OCH$_2$CH$_3$); 0(1.12C, s, SiCH$_3$).

GPC (gel permeation chromatography): Mw: weight-average molecular weight=1.5×10$^4$; Mn: number-average molecular weight=4.1×10$^3$.

It was determined that the obtained hexenyl radical-containing silicone resin is an organo-silicon polymer with residual hydroxy radicals and ethoxy radicals on its terminals and having a chemical configuration represented by the average unit formula:

(CH$_2$=CHC$_4$H$_8$Me$_2$SiO$_\frac{1}{2}$)$_{0.49}$(SiO$_{4/2}$)$_{1.0}$

APPLICATION EXAMPLE 2

14.3 g of toluene were added to 14.3 g of the resin product of Application Example 1, followed by addition of 3.2 g (0.02 mol) of (Me$_3$Si)$_2$NH, and then heating with reflux for 6 hours. After cooling, the reaction mixture was washed once by 50 g of water, neutralized by an aqeuous hydrochloric acid solution, and then washed with water repeatedly. Then a water isolating tube was used to heat the sample with reflux for dehydration, and solvent was further distilled off, forming 15.1 g of light-yellowish oil-like substance.

The analytical results of the oil-like substance are as follows.

$^{29}$SiNMR δ (ppm): 13(0.41Si, br, R'Me$_2$SiO$_\frac{1}{2}$); -100(0.11Si, br, ROSiO$_{3/2}$); -110(0.48Si, br, SiO$_{4/2}$); (R represents CH$_3$CH$_2$ or H, R' represents CH$_2$=CH(CH$_2$)CH$_4$ or Me).

$^{13}$CNMR δ (ppm): 139(1.00C, s, =CH—); 115(1.00C, s, CH$_2$=); 59(0.25C, s, —OCH$_2$CH$_3$); 34(1.06C, s, Si(CH$_2$)$_3$CH$_2$—); 33(1.06C, s, Si(CH$_2$)$_2$CH$_2$—); 23(0.94C, s, SiCH$_2$CH$_2$—); 18(1.28C, s, SiCH$_2$— or —OCH$_2$CH$_3$); 0(3.56C, s, SiCH$_3$).

GPC (gel permeation chromatography): Mw: weight-average molecular weight=8.2×10$^4$; Mn: number-average molecular weight=4.0×10$^3$.

It was determined that the obtained hexenyl radical-containing silicone resin is an organo-silicon polymer with residual hydroxy radicals and ethoxy radicals on its terminals and having a chemical configuration represented by the average unit formula:

$(Me_3SiO_{\frac{1}{2}})_{0.22}(SiO_{4/2})_{1.0}(CH_2=CHC_4H_8Me_2SiO_{\frac{1}{2}})_{0.48}$

COMPARATIVE EXAMPLE 1

The method described in Japanese Kokai Patent Application No. Sho 61[1986]-195129 was adopted in a test to synthesize an organo-silicon polymer represented by the formula $(CH_2=CHC_4H_8Me_2SiO_{0.5})_{0.45}(SiO_2)_1$ in the following process: 6.71 g (0.0225 mol) of disiloxane represented by the formula $(CH_2=CHC_4H_8Me_2Si)_2O$, 4 g of toluene, 2 g of ethanol, 2 g of acetone, and 8 g of 12N hydrochloric acid were mixed by stirring and heating at 76° C., while 20.8 g (0.1 mol) of ethyl silicate were added drop-wise. However, midway through the dropwise addition of ethyl silicate, a gel-like substance was generated. The gel-like substance could not be dissolved even after adding an organic solvent.

APPLICATION EXAMPLE 3

6.52 g (0.02 mol) of disiloxane represented by the formula $(CF_3CH_2CH_2Me_2Si)_2O$ 20.8 g (0.1 mol) of tetraethoxysilane, 12.0 g of α,α,α-trifluorotoluene as the organic solvent and 0.02 g of trifluoromethanesulfonic acid were added to a flask, and reaction was performed at 65° C. for 5 hours while the mixture was stirred.

Then at 65° C., a mixture of 10.1 g of water and 6.8 g of 36% aqueous hydrochloric acid solution were added drop-wise over 30 minutes. After the end of the drop-wise addition, stirring was continued at 77° C. for 30 minutes. Then the reaction mixture was cooled and the organic layer was isolated from the water layer, and was washed with water to neutrality. It was then moved to a flask with a water isolating tube attached, where dehydration was performed at reflux temperature. After cooling, the solvent was removed, and 13.9 g of white solid substance at room temperature were obtained.

The white solid substance obtained was soluble in tetrahydrofuran, acetone, methyl isobutyl ketone, α,α,α-trifluorotoluene, and other organic solvents. The analytical results of the white solid substance are as follows.

$^{29}$SiNMR δ(ppm): 13(0.30Si, br, $CF_3CH_2CH_2Me_2Si_{\frac{1}{2}}$); −100(0.25Si, br, $ROSiO_{3/2}$); −110(0.45Si, br, $SiO_{4/2}$); (R is $CH_3CH_2$ or H.).

$^{13}$CNMR δ(ppm): 128(3.81C, q, —$CF_3$); 59(0.91C, s, —$OCH_2CH_3$); 28(4.20C, s, —$SiCH_2CH_2CF_3$); 18(1.00C, s, —$OCH_2CH_3$); 10(4.06C, s, $SiCH_2$—); 0(8.16C, s, S, $SiCH_3$).

GPC (gel permeation chromatography): Mw: weight-average molecular weight = $8.0 \times 10^3$; Mn: number-average molecular weight = $6.2 \times 10^3$.

It was determined that the obtained trifluoropropyl radical-containing silicone resin is an organo-silicon polymer with residual hydroxy radicals and ethoxy radicals on its terminals and having a chemical configuration represented by the average unit formula: $(CF_3C_2H_4Me_2SiO_{\frac{1}{2}})_{0.43}(SiO_{4/2})_{1.0}$

COMPARATIVE EXAMPLE 2

The method disclosed in Japanese Kokai Patent Application No. Sho 61[1986]-195129 was used. 18.6 g (0.1 mol) of disiloxane represented by the formula $(CH_2=CHMe_2Si)_2O$, 30 g of toluene, 6 g of acetone, 6 g of ethanol, 12 g of concentrated hydrochloric acid and 17 g of water were mixed. While the mixture was stirred at 70° C., 83.3 g (0.4 mol) of ethyl silicate were added drop-wise. After cooling, 100 ml of toluene were added. After isolation from the water layer, the organic layer was washed with water to neutrality, and dehydration was carried out by azeotropic process with toluene. Then 11.3 g of hexamethyldisilazane were added, followed by heating with reflux for 6 hours in toluene solvent. The organic layer was then washed with water to neutrality, and dehydration was performed with azeotropic process with toluene to further remove the low-boiling-point components, forming the organo-silicon polymer. This organo-silicon polymer was in solid form at room temperature. The organo-silicon polymer was dissolved in toluene with a concentration of 10 wt %. It was found that when the solution was filtered under a reduced pressure using No. 5A filter paper, clogging occurred, and the filtering property was poor.

APPLICATION EXAMPLE 4

18.6 g (0.1 mol) of disiloxane represented by the formula $(CH_2=CHMe_2Si)_2O$, 83.3 g (0.4 mol) of tetraethoxysilane, 40 g of toluene and 4 g of 98% sulfuric acid were blended and heated at 80° C. for 6 hours. Then a mixture of 12 g of 12N hydrochloric acid and 20 g of water was added drop-wise. After the end of the drop-wise addition, stirring was continued at 76° C. for 4 hours.

Then the reaction mixture was cooled and 50 g of toluene were added. After the organic layer was isolated from the water layer, it was washed with water to neutrality. It was then moved to a flask with a water isolating tube attached, where dehydration was performed at reflux temperature. Then toluene was removed until the solids content became 50 wt %. After cooling, 11.3 g of hexamethyldisilazane were added, followed by 6 hours of heating with reflux. After cooling, the organic layer was washed with water to neutrality, and dehydration was performed with an azeotropic process with toluene to further remove the organic solvent, forming organo-silicon polymer. NMR analysis of the organo-silicon polymer indicated that it has a chemical configuration represented by the formula $(CH_2=CHMe_2SiO)_{0.5}(Me_3SiO_{0.5})_{0.1}(SiO_2)_{1.0}$, and is in solid form at room temperature.

The organo-silicon polymer was dissolved in toluene to form a solution with a concentration of 10 wt %. When it was filtered using a No. 5A filter paper under a reduced pressure, excellent filtration property was displayed, and there was no problem.

APPLICATION EXAMPLE 5

45.0 g (0.15 mol) of disiloxane represented by formula $(CH_2=CHC_4H_8SiMe_2)_2O$, 624.9 g (3.00 mol) of tetraethoxysilane, 360.0 g of toluene, and 240 μL of trifluoromethanesulfonic acid were added to a flask, and reaction was performed at 65° C. for 5 hours while the mixture was stirred. As the reaction mixture was analyzed using gas chromatography, it was found that almost all of the disiloxane represented by the formula $(CH_2=CHC_4H_8Me_2Si)_2O$ disappeared. After cooling, 141.6 g (1.20 mol) of trimethylethoxysilane were added, followed by heating and stirring. Then at 60° C., a mixture of 151.2 g of water and 102.0 g of 36% aqueous hydrochloric acid solution was added drop-wise in 30 min. After the end of the drop-wise addition, stirring was continued at 73° C. for 4 hours. Then the reaction mixture was cooled, the lower organic layer was taken and 550 g of toluene were added to it. It was then moved to a flask with a water isolating tube attached, where dehydration was performed at reflux temperature, and toluene was removed until the solid concentration became 50 wt %. After cooling, 145.3 g (0.9 mol) of hexamethyldisilazane were added, followed by 6 hours of heating with reflux. After cooling, the organic layer was washed with water to neutrality, and dehydration was performed using azeotropic process with toluene; the solvent was removed, and 324.8 g of light-yellowish transparent solid substance were obtained.

The analytical results of the solid substance are as follows.

$^{29}$SiNMR δ (ppm): 13(0.41Si, br, R'Me$_2$SiO$_{\frac{1}{2}}$); -100(0.07Si, br, ROSiO$_{3/2}$); -110(0.52Si, br, SiO$_{4/2}$); (R is CH$_3$CH$_2$ or H, R' represents CH$_2$=CH(CH$_2$)$_4$ or Me.).

$^{13}$CNMR δ (ppm): 139(0.82C, s, =CH—); 115(0.82C, s, =CH$_2$); 59(1.36C, s, —OCH$_2$CH$_3$); 34(1.00C, s, Si(CH$_2$)$_3$CH$_2$—); 33(1.09C, s, Si(CH$_2$)$_2$CH$_2$—); 23(1.00C, s, SiCH$_2$CH$_2$—); 18(2.45C, s, SiCH$_2$— or —OCH$_2$CH$_3$); 0(12.30C, s, SiCH$_3$).

GPC (gel permeation chromatography): Mw: weight-average molecular weight = $6.5 \times 10^3$; Mn: number-average molecular weight = $3.1 \times 10^3$.

It was determined that the obtained hexenyl radical-containing silicone resin is an organo-silicon polymer with residual hydroxy radicals and ethoxy radicals on its terminals and having a chemical configuration represented by the average unit formula:

$$(CH_2=CHC_4H_8Me_2SiO_{\frac{1}{2}})_{0.14}(Me_3SiO_{\frac{1}{2}})_{0.54}(SiO_{4/2})_{1.0}$$

What is claimed is:

1. A method for making an organo-silicon polymer of the general formula:

$$(Me_2RSiO_{\frac{1}{2}})_m(SiO_{4/2})_n$$

wherein:
Me is a methyl radical;
R is a substituted or unsubstituted monovalent hydrocarbon radical having two or more carbon atoms; and
the ratio of m/n is between 0.2 and 4;
the method comprising the steps of:
mixing components
(A) disiloxane of the general formula (Me$_2$RSiO)$_2$ and
(B) alkyl silicate;
said components (A) and (B) being present in a molar ratio of substantially ½ m/n;
adding between 0.005 parts and 50 parts by weight of a strong protic acid to 100 parts by weight of the above mixture of components (A) and (B) and allowing the same to react; and
adding an aqueous solution of hydrochloric acid to the above reaction mixture in a drop-wise manner.

2. A method in accordance with claim 1 wherein said aqueous solution of hydrochloric acid contains over 5 wt % hydrogen chloride.

3. A method in accordance with claim 2 wherein said aqueous solution contains over 10% hydrogen chloride.

4. A method in accordance with claim 1 wherein the mixture of components (A) and (B) is carried out in an organic solvent, said organic solvent being substantially nonreactive with components (A) and (B) and said strong protic acid.

5. A method in accordance with claim 1 wherein said strong protic acid is selected from the group consisting of: sulfuric acid; trifluoromethanesulfonic acid; chlorosulfonic acid; trichloroacetic acid; trifluoroacetic acid; p-toluenesulfonic acid; phosphoric acid; and nitric acid.

6. A method in accordance with claim 1 wherein R, the substituted or unsubstituted monovalent hydrocarbon radical associated with said disiloxane, component (A), is selected from the group consisting of an ethyl radical, propyl radical, butyl radical, or other alkyl radical; a cyclohexyl radical, or other cycloalkyl radical; a vinyl radical, allyl radical, hexenyl radical, or other alkenyl radical; a phenyl radical, xylyl radical, or other aryl radical; a phenylethyl radical, or other aralkyl radical; 3-chloropropyl radical, 3,3,3-trifluoropropyl radical; and mixtures thereof.

7. A method in accordance with claim 1 wherein said alkyl silicate is selected from the group consisting of: orthomethyl silicate; polymethyl silicate; orthoethyl silicate; polyethyl silicate; orthopropyl silicate; polypropyl silicate; and mixtures thereof.

8. A method in accordance with claim 1 further comprising the step of adding an hydrolyzable alkyl silane to said mixture of components (A) and (B) after addition of said strong protic acid but before the drop-wise addition of said aqueous hydrochloric acid solution.

* * * * *